United States Patent Office 3,834,996
Patented Sept. 10, 1974

3,834,996
INHIBITING POLYMERIZATION OF OXYGEN CONTAINING TETRAFLUOROETHYLENE
Hiroshi Aiso, Kawanishi, and Tatsuya Hirose and Kazuhisa Kato, Setsu, Japan, assignors to Daikin Kogyo Kabushiki Kaisha, Osaka-shi, Japan
Filed Nov. 22, 1971, Ser. No. 200,856
Claims priority, application Japan, Nov. 26, 1970, 45/104,642
Int. Cl. F25j 3/00
U.S. Cl. 203—9
4 Claims

ABSTRACT OF THE DISCLOSURE

A method for rectifying oxygen-containing tetrafluoroethylene is characterized by contacting effluent tetrafluoroethylene vapor from a rectification tower with a liquid terpene in a condensing line to produce condensed tetrafluoroethylene saturated with terpene and refluxing the condensed tetrafluoroethylene saturated with terpene; and an apparatus for rectifying oxygen-containing tetrafluoroethylene comprises a rectification tower, a condensing line for contacting effluent tetrafluoroethylene vapor from the rectification tower with liquid terpene to produce condensed tetrafluoroethylene saturated with terpene and a line for refluxing the condensed tetrafluoroethylene saturated with terpene to the top of the rectification tower.

---

This invention relates to an improved method for rectifying oxygen-containing tetrafluoroethylene.

As described in British Pat. No. 1,041,738, tetrafluoroethylene has been commercially prepared by pyrolyzing chlorodifluoromethane and rectifying the pyrolyzed product to separate tetrafluoroethylene thus produced from the reaction mixture. The problem to be encountered in accordance with this method is that pyrolyzed tetrafluoroethylene is liable to be polymerized during the rectification step, this not only reducing the rectification efficiency but also causing the rectifying and condensing lines to be blocked. The above undesired polymerization of tetrafluoroethylene is markedly accelerated by oxygen unavoidably contained in the pyrolysis product. The pyrolysis product of chlorodifluoromethane usually contains 30–100 p.p.m. by weight of oxygen together with noncondensable gas such as CO, $CO_2$, etc. and with high boilers such as unreacted chlorodifluoromethane, hexafluoropropylene, perfluorocyclobutane, etc. During the rectification step in which oxygen, carbon monoxide and like non-condensable gases and high boilers are removed from the pyrolysis product, the undesired polymerization of tetrafluoroethylene occurs at the top of a rectification tower and a condensing line where the concentration of oxygen is increased.

While it is known to prevent the polymerization of tetrafluoroethylene in storage as described in U.S. Pat. No. 2,737,533, using as polymerization inhibitor various organic substances, such as hydrocarbon thiols, tertairy hydrocarbon amines, terpenes, α-methylvinylbenzene, etc., no successful method has been proposed yet to prevent the undesired polymerization of oxygen-containing tetrafluoroethylene which inevitably occurs during rectification step. This is attributable to the fact that the concentration of oxygen which promotes the polymerization is increased at the top of a rectification tower and a condensing line and that it is difficult to distribute the polymerization inhibitor evenly in the tetrafluoroethylene vapor rising in the tower and in the condensed tetrafluoroethylene.

An object of the invention is to provide a method for rectifying oxygen-containing tetrafluoroethylene, whereby tetrafluoroethylene substantially free from oxygen can be obtained without any undesired polymerization thereof during a rectification step.

A further object of the invention is to provide a method for producing tetrafluoroethylene free from impurities by rectification from pyrolysis products of chlorodifluoromethane without undesired polymerization of tetrafluoroethylene during a rectification step.

These and other objects and advantages of the invention will be apparent from the following description.

The present method for rectifying oxygen-containing tetrafluoroethylene comprises (1) continuously supplying oxygen-containing tetrafluoroethylene to a rectification tower, (2) contacting effluent tetrafluoroethylene vapor from said rectification tower with a liquid terpene in a condensing line to produce condensed tetrafluoroethylene saturated with terpene, (3) evaporating off the oxygen as noncondensable gas, (4) refluxing the condensed tetrafluoroethylene saturated with terpene at a reflux ratio of at least 50 and (5) recovering liquid tetrafluoroethylene substantially free from oxygen from the rectifying line.

According to the present invention the undesired polymerization of tetrafluoroethylene can be effectively prevented in spite of the presence of oxygen, making it possible to obtain tetrafluoroethylene substantially free of oxygen without any undesired polymerization thereof during rectification step. This is attributable to the fact that the terpene used as a polymerization inhibitor is homogeneously distributed in an effective and constant amount in vapor phase tetrafluoroethylene at the top of rectification tower and in liquid phase tetrafluoroethylene in condensing line, where the polymerization of tetrafluoroethylene mainly occurs due to the increase of concentration of oxygen.

Terpenes used as a polymerization inhibitor in the present invention include unsaturated hydrocarbons of the formula of $C_{10}H_{16}$. Examples thereof are monocyclic terpenes such as dipentene, limonene, phellandrene, etc., dicyclic terpenes such as carane, pinene, camphene, etc., and olefine terpenes such as myrcene, etc. These terpenes can be used alone or in admixture with one another. Preferable example thereof is a terpene mixture available as "Terpene B" which is a terpene fraction consisting principally of dipentene and terpinolene.

The oxygen-containing tetrafluoroethylene to be rectified in the present invention usually contains not less than 30 p.p.m. of oxygen. Such oxygen-containing tetrafluoroethylene may contain other impurities such as other noncondensable gases and/or high boilers. Representative example of the oxygen-containing tetrafluoroethylene is a pyrolysis product of chlorodifluoromethane, which contains oxygen in an amount of 30 to 100 p.p.m. together with other noncondensable gases such as carbon monoxide and with high boilers such as unreacted chlorodifluoromethane, hexafluoropropylene, perfluorocyclobutane, etc.

According to the present invention the temperature and pressure in the rectification step are the same as in the conventional manner. For example, oxygen-containing tetrafluoroethylene is continuously supplied to a rectification tower and rectified under an increased pressure of 5 to 25 kg./cm.$^2$, preferably 10 to 25 kg./cm.$^2$, at a temperature of −40 to 20° C., preferably −20 to 20° C. According to the present invention the effluent tetrafluoroethylene vapor from the rectification tower is brought into contact with liquid terpene in condensing line. Various measures are applicable for contacting effluent gas with liquid terpene. For example, effluent tetrafluoroethylene vapor can be bubbled into liquid terpene stored in a tank or brought into countercurrent contact with liquid terpene flowing downwardly in a condenser. The concentrated oxygen and other noncondensable gases may be distilled off from a condensing line. The condensed tetrafluoroethylene is separated from liquid terpene due to the difference of specific gravities of the both substances to produce liquid tetrafluoroethylene layer saturated with terpene at the bottom of the condenser. The liquid tetrafluoroethylene saturated with terpene is refluxed from the bottom of the condenser to the top of the rectification tower at a reflux ratio of at least 50, whereby effective distribution of terpene in tetrafluoroethylene vapor at the top of the rectification tower can be ensured. That is to say, by such refluxing terpene can be distributed in the vapor of tetrafluoroethylene at the top of rectification tower in an effective and constant amount to prevent completely undesired polymerization of tetrafluoroethylene at the top of the rectification tower and in the condensing line. It is essential in the invention to conduct the rectification at a reflux ratio of not less than 50. If the reflux ratio is reduced to less than 50, oxygen and other noncondensable gases can not be separated effectively. Total reflux is the most preferable but it is preferable to conduct the rectification at a reflux ratio of 50 to 150.

The tetrafluoroethylene from which oxygen is substantially removed is continuously taken out from the bottom of the rectification tower in liquid form. If the tetrafluoroethylene thus obtained contains high boilers such as chlorodifluoromethane, hexafluoropropene, perfluorocyclobutane, etc. as in the case of a pyrolysis product of chlorodifluoromethane, it may be subjected to further rectification in order to remove such high boilers. In such a case the further rectification may be conducted in conventional manner without being accompanied by undesired polymerization of tetrafluoroethylene, since the oxygen content of the tetrafluoroethylene rectified in accordance with the present invention is usually reduced to a negligible amount of less than 30 p.p.m. at which no polymerization problem occurs. However, it may also be possible to subject the tetrafluoroethylene obtained by the present invention to further rectification conducted in accordance with the principle of the invention in which effluent tetrafluoroethylene vapor is brought into contact with liquid terpene in condensing line. In the latter case the tetrafluoroethylene is rectified in a rectification tower under a conventional condition and effluent tetrafluoroethylene vapor from the tower is brought into contact with liquid terpene for partial condensation. Noncondensed tetrafluoroethylene is then recovered from the condenser with separation from high boilers condensed. The partially condensed tetrafluoroethylene is refluxed to the rectification tower. In this case the reflux ratio is preferably in the range of 10 to 50.

For a better understanding of the invention examples are given below in which are used the apparatuses shown in accompanied drawings wherein.

Figure 1:
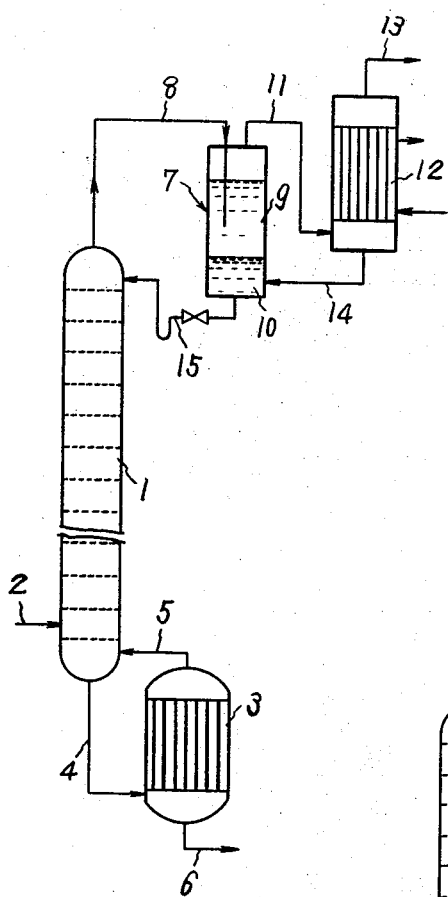
FIG. 1 is a flow sheet showing one preferred embodiment of the present method.

Referring to FIG. 1, a rectification tower 1 is equipped at the lower portion with a line 2 for continuously introducing therein oxygen-containing tetrafluoroethylene to be rectified. The bottom of the tower 1 is connected to a still 3 by circulation lines 4 and 5. The bottom of the still 3 is provided with a line 6 for recovering tetrafluoroethylene free from oxygen. The top of the rectification tower 1 is connected by a line 8 to a terpene tank 7 which is charged with liquid terpene 9. The end of the line 8 extends into the liquid terpene layer 9 so as to allow the tetrafluoroethylene vapor to be bubbled into the liquid terpene 9. Designated at 10 is a condensed tetrafluoroethylene layer formed at the bottom of the terpene tank 7. A line 11 connects the top of the terpene tank 7 to the bottom of a condenser 12 having a multi-tubular structure into which brine is introduced. Designated at 13 is a line for taking out noncondensable gases. The bottom of the secondary condenser 12 is connected to the bottom of the terpene tank 7 by a line 14 and the latter is further connected to the top of the rectification tower 1 by a line 15.

Figure 2:
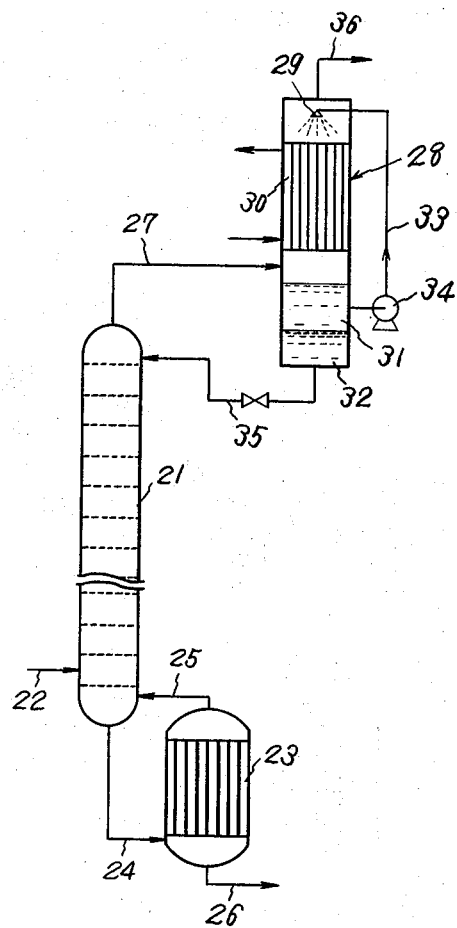
FIG. 2 is a flow sheet showing another preferred embodiment of the present invention.

Referring to FIG. 2, a rectification tower 21 is equipped at the lower portion with a line 22 for continuously introducing oxygen-containing tetrafluoroethylene to be rectified therein. The tower 21 is further provided with a still 23 with circulation lines 24 and 25. The still 23 is equipped with a line 26 for recovering tetrafluoroethylene free from oxygen. The top of the rectification tower 21 is connected by a line 27 to an intermediate portion of a condenser 28 which has at its upper portion means 29 for showering liquid terpene so as to contact the liquid terpene countercurrently with tetrafluoroethylene vapor which moves upward when introduced into the condenser through the line 27. At the portion where both liquid and vapor come into contact with each other, there is disposed a multi-tubular structure 30 for charging brine. The condensed tetrafluoroethylene and terpene stay at the lower portion of the condenser 28 and are separated from each other due to the difference in specific gravities, with a terpene layer 31 positioned on a layer 32 of the condensed tetrafluoroethylene which is saturated with terpene in the bottom of the condenser. The terpene layer 31 is sent back to the means 29 by way of a line 33 and pump 34 for circulation. The bottom of the condenser 28 communicates with the top of the rectification tower 21 through a line 35 to conduct the condensed tetrafluoroethylene 32 back to the tower. A line 36 for discharging noncondensed gas is connected to the top of the condenser 28.

EXAMPLE 1

In this example pyrolysis product of chlorodifluoromethane containing 0.01 wt. percent of oxygen obtained by removing hydrogen chloride from pyrolysis product of chlorodifluoromethane was used. The pyrolysis product used contained tetrafluoroethylene, unreacted chlorodifluoromethane and high boilers in an weight ratio of 10:9:1. The rectification was conducted using a rectification apparatus shown in FIG. 1. The rectification tower 1 used was plate-type tower having 30 trays and a dimension of 100 mm. in diameter and 9 m. in height. In terpene tank 7 was placed 200 l. of "Terpene B" (the same as defined before).

The pyrolysis product was supplied at a rate of 40 kg./hr. to the rectification tower 1 through a line 2. The rectification was conducted by maintaining the temperature in still at 15° C., at the top of the tower at −5° C., in terpene layer at −5° C. The pressure in the rectifying and condensing lines was kept at 15 kg./cm². The reflux ratio was 100.

Effluent tetrafluoroethylene vapor from the rectification tower contained 30 p.p.m. of terpene and noncondensed tetrafluoroethylene vapor from terpene tank contained 1000 p.p.m. of terpene. The condensed tetrafluoroethylene to be fluxed to the tower 1 contained 220 p.p.m. of terpene.

The tetrafluoroethylene recovered from the rectifying line contained oxygen in an amount of less than 10 p.p.m. together with high boilers.

The rectification was continued for one year under the above conditions, but no polymerization of tetrafluoroethylene was observed in both rectifying and condensing lines.

On the contrary, when the rectification was conducted under the same conditions as above except that terpene was not used, the condenser and refluxing pipes were blocked due to the production of polymer after one month of continuous operation.

The recovered tetrafluoroethylene containing high boilers and less than 10 p.p.m. of oxygen was further rectified to remove high boilers therefrom using a Raschig ring-packed rectification tower having a dimension of 6 m. in height and 80 mm. in diameter. In this rectification step terpene was not used and the top of the rectification tower was directly connected to a condenser.

The tetrafluoroethylene was supplied at a rate of 2.5 kg./hr. to the rectification tower. The rectification was conducted by maintaining the temperature in still at 15° C., at the top of the tower —5° C. and in condenser at —5° C. The pressure in the rectifying and condensing lines was kept at 15 kg./cm². The reflux was 20.

Thus purified tetrafluoroethylene free of high boilers was obtained in the form of vapor from the condensing line at a rate of 1.4 kg./hr. From the bottom of the rectification tower 1.1 kg./hr. of high boilers was obtained.

After one month of continuous operation no polymerization of tetrafluoroethylene was observed.

EXAMPLE 2

Using rectification apparatus shown in FIG. 2, the same crude tetrafluoroethylene as in Example 1 was rectified. The rectification tower used was the same as in Example 1. 200 l. of "Terpene-B" was charged in condenser 28 and circulated in a rate of 100 l./hr. through line 33 and means 29. The crude tetrafluoroethylene was supplied at a rate of 40 kg./hr. to the rectification tower 21. The rectification was conducted by maintaining the temperature in still at 30° C., at the top of the tower at 15° C. and in condenser at 15° C. The pressure in the rectifying and condensing lines was kept at 25 kg./cm.². The reflux ratio was 100.

The terpene content of the effluent gas from the rectification tower was 50 p.p.m. and that of the condensed tetrafluoroethylene to be refluxed was 390 p.p.m.

The tetrafluoroethylene recovered from the rectifying line contained oxygen in an amount of less than 5 p.p.m. together with high boilers.

After one month of continuous operation no polymerization of tetrafluoroethylene was observed.

On the contrary, when terpene was not used, the polymerization of tetrafluoroethylene was observed after one week of continuous operation.

What we claim is:

1. A method for rectifying oxygen-containing tetrafluoroethylene without undesired polymerization of tetrafluoroethylene during the rectification which comprises continuously supplying oxygen-containing tetrafluoroethylene to a rectification tower, contacting effluent tetrafluoroethylene containing gaseous oxygen vapor from said rectification tower with a liquid terpene in a first condensing zone to produce condensed tetrafluoroethylene saturated with terpene, removing the oxygen as noncondensable gas along with terpene vapor from the condensing zone, separating the terpene from the oxygen in a second condensing zone for return of the terpene to the first condensing zone refluxing the condensed tetrafluoroethylene saturated with terpene to the top of the rectification tower at a reflux ratio of at least 50 and recovering liquid tetrafluoroethylene substantially free from oxygen from the rectification tower.

2. The method for rectifying oxygen-containing tetrafluoroethylene according to Claim 1, in which said oxygen-containing tetrafluoroethylene is a pyrolysis product of chlorodifluoromethane.

3. The method for rectifying oxygen-containing tetrafluoroethylene according to Claim 1, in which said reflux ratio is total reflux.

4. The method for rectifying oxygen-containing tetrafluoroethylene according to Claim 1, in which said oxygen-containing tetrafluoroethylene is a pyrolysis product of chlorodifluoromethane and said recovered tetrafluoroethylene is further rectified to remove high boilers contained therein.

References Cited

UNITED STATES PATENTS

| | | | |
|---|---|---|---|
| 3,493,472 | 2/1970 | Schumacher | 203—42 |
| 2,753,379 | 4/1956 | Landrum | 260—653.3 |
| 2,994,723 | 8/1961 | Scherer | 260—653.3 |
| 3,284,169 | 11/1966 | Tominaga | 260—653.3 |
| 2,902,521 | 9/1959 | Cleaver | 260—653.3 |
| 2,831,901 | 4/1958 | Rearick | 203—42 |
| 2,737,533 | 3/1956 | Marks et al. | 260—653.3 |
| 3,221,070 | 11/1965 | Okamura et al. | 260—653.3 |
| 3,282,801 | 11/1966 | Wiist | 260—653.3 |

FOREIGN PATENTS

| | | | |
|---|---|---|---|
| 1,812,820 | 5/1970 | Germany | 260—653.3 |

NORMAN YUDKOFF, Primary Examiner

F. SEVER, Assistant Examiner

U.S. Cl. X.R.

260—653.3; 62—17, 28; 203—68